(12) United States Patent
Keller, III et al.

(10) Patent No.: US 9,887,721 B2
(45) Date of Patent: *Feb. 6, 2018

(54) INTEGRATED CIRCUIT WITH ELECTROMAGNETIC ENERGY ANOMALY DETECTION AND PROCESSING

(71) Applicant: Nokomis, INC., Charleroi, PA (US)

(72) Inventors: Walter J Keller, III, Bridgeville, PA (US); Bogdan A. Pathak, Toledo, OH (US)

(73) Assignee: NOKOMIS, INC., Charleroi, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,139

(22) Filed: May 4, 2015

(65) Prior Publication Data
US 2016/0112083 A1    Apr. 21, 2016

Related U.S. Application Data

(63) Continuation of application No. 13/410,909, filed on Mar. 2, 2012, now Pat. No. 9,059,189.
(Continued)

(51) Int. Cl.
*H01L 23/00* (2006.01)
*H04B 1/26* (2006.01)
(Continued)

(52) U.S. Cl.
CPC .............. *H04B 1/26* (2013.01); *G06F 21/44* (2013.01); *G06F 21/76* (2013.01); *G06F 21/87* (2013.01);
(Continued)

(58) Field of Classification Search
CPC ........... H01L 23/576; H01L 2223/6677; H01L 2924/14; H01L 2924/19105;
(Continued)

(56) References Cited

U.S. PATENT DOCUMENTS 3,930,734 A    1/1976  Holly et al.
4,614,945 A    9/1986  Brunius et al.
(Continued)

FOREIGN PATENT DOCUMENTS

JP    06011530       1/1994
JP    H09502804      3/1997
(Continued)

OTHER PUBLICATIONS

William E. Cobb, et al., Intrinsic Physical-Layer Authentication of Integrated Circuits, Leee Transactions on Information Forensics and Security, vol. 7, No. 1, Feb. 2012.
(Continued)

*Primary Examiner* — Thomas Mullen
(74) *Attorney, Agent, or Firm* — James Ray and Assoc. IP LLC (57) ABSTRACT

An integrated circuit includes an antenna, a die manufactured from a semiconducting material, an RF energy collection and processing means disposed on or within said die and including at least a receiver and a processing means, an input configured to supply power to said RF energy collection and processing means and an output for operative communication by said RF energy collection and processing means. The integrated circuit is configurable and operable to provide at least one of electromagnetic emission anomaly detection, tamper detection, anti-tamper monitoring, degradation monitoring, health monitoring, counterfeit detection, software changes monitoring, firmware changes monitoring and monitoring of other RF energy anomalies.

33 Claims, 7 Drawing Sheets

Related U.S. Application Data (60) Provisional application No. 61/464,262, filed on Mar. 2, 2011, provisional application No. 61/574,250, filed on Jul. 29, 2011.

(51) Int. Cl.
  *G06F 21/44* (2013.01)
  *G06F 21/76* (2013.01)
  *G06F 21/87* (2013.01)
  *H01L 23/66* (2006.01)

(52) U.S. Cl.
  CPC ............ *H01L 23/576* (2013.01); *H01L 23/66* (2013.01); *H01L 2223/6677* (2013.01); *H01L 2924/0002* (2013.01); *H01L 2924/14* (2013.01); *H01L 2924/19105* (2013.01)

(58) Field of Classification Search
  CPC ............ H01L 2924/0002; H01L 23/66; G06K 19/0723; G06K 19/0716; G06K 19/0701; H01Q 1/2225; H04B 1/26; G06F 21/44; G06F 21/76; G06F 21/87
  USPC .................................................. 340/5.8, 572.1
  See application file for complete search history.

(56) References Cited

U.S. PATENT DOCUMENTS

| | | |
|---|---|---|
| 5,218,294 A | 6/1993 | Soiferman |
| 5,227,800 A | 7/1993 | Huguenin et al. |
| 5,302,830 A | 4/1994 | Shivanandan |
| 5,424,633 A | 6/1995 | Soiferman |
| 5,517,110 A | 5/1996 | Soiferman |
| 5,668,342 A | 9/1997 | Discher |
| 5,714,888 A | 2/1998 | Naujoks |
| 5,764,087 A | 6/1998 | Clark |
| 6,049,301 A | 4/2000 | Weagant |
| 6,057,765 A | 5/2000 | Jones et al. |
| 6,163,259 A | 12/2000 | Barsumian et al. |
| 6,496,703 B1 | 12/2002 | da Silva |
| 6,720,905 B2 | 4/2004 | Levitan et al. |
| 6,759,863 B2 | 7/2004 | Moore |
| 6,765,527 B2 | 7/2004 | Jablonski et al. |
| 6,825,456 B2 | 11/2004 | Chadwick et al. |
| 6,897,777 B2 | 5/2005 | Holmes et al. |
| 6,927,579 B2 | 8/2005 | Blades |
| 6,985,771 B2 | 1/2006 | Fischell et al. |
| 7,130,624 B1 | 10/2006 | Jackson et al. |
| 7,138,936 B2 | 11/2006 | Duff et al. |
| 7,188,037 B2 | 3/2007 | Hidehira |
| 7,391,356 B2 | 6/2008 | Brumley et al. |
| 7,512,511 B1 | 3/2009 | Schultz et al. |
| 7,515,094 B2 | 4/2009 | Keller, III |
| 7,609,199 B2 | 10/2009 | Nishijima et al. |
| 7,639,178 B1 | 12/2009 | Mulbrook et al. |
| 7,777,671 B2 | 8/2010 | Schnitzer et al. |
| 7,777,672 B2 | 8/2010 | Schnitzer et al. |
| 7,844,341 B2 | 11/2010 | Von Arx et al. |
| 8,063,813 B1 | 11/2011 | Keller |
| 8,193,819 B2 | 6/2012 | Wang et al. |
| 9,059,189 B2 * | 6/2015 | Keller, III ............ H01L 23/576 |
| 2004/0078160 A1 | 4/2004 | Frei et al. |
| 2005/0116307 A1 | 6/2005 | De Jongh et al. |
| 2005/0151617 A1 | 7/2005 | Nakazawa |
| 2005/0151648 A1 | 7/2005 | Nakazawa |
| 2005/0265124 A1 | 12/2005 | Smith |
| 2006/0152232 A1 | 7/2006 | Shvets et al. |
| 2007/0027643 A1 | 2/2007 | Lesesky et al. |
| 2007/0214133 A1 | 9/2007 | Liberty et al. |
| 2007/0229270 A1 | 10/2007 | Rofougaran |
| 2007/0234058 A1 | 10/2007 | White |
| 2007/0279071 A1 | 12/2007 | Orton |
| 2008/0103555 A1 | 5/2008 | Dicks et al. |
| 2008/0259084 A1 | 10/2008 | Chang et al. |
| 2008/0284609 A1 | 11/2008 | Rofougaran |
| 2009/0099830 A1 | 4/2009 | Gross et al. |
| 2009/0218657 A1 | 9/2009 | Rofougaran |
| 2010/0033386 A1 | 2/2010 | Lewis et al. |
| 2010/0035557 A1 | 2/2010 | Shellhammer |
| 2010/0073229 A1 | 3/2010 | Pattabiraman et al. |
| 2010/0123453 A1 | 5/2010 | Pauly et al. |
| 2010/0125438 A1 | 5/2010 | Audet |
| 2010/0230597 A1 | 9/2010 | Kumhyr et al. |
| 2010/0237854 A1 | 9/2010 | Kumhyr et al. |
| 2010/0241864 A1 | 9/2010 | Kelley et al. |
| 2010/0295552 A1 | 11/2010 | Li et al. |
| 2010/0332199 A1 | 12/2010 | Dhanekula et al. |
| 2011/0320170 A1 | 12/2011 | Pathak et al. |
| 2012/0160914 A1 | 6/2012 | Fratti |
| 2012/0179812 A1 | 7/2012 | Keller, III |
| 2012/0223403 A1 | 9/2012 | Keller, III et al. |
| 2012/0226463 A1 | 9/2012 | Keller, III et al. |

FOREIGN PATENT DOCUMENTS

| | | |
|---|---|---|
| JP | 2000076387 | 3/2000 |
| JP | 2003503679 | 1/2003 |
| JP | 2003294842 | 10/2003 |
| JP | 2004245709 | 9/2004 |
| JP | 2004526970 | 9/2004 |
| JP | 2007510932 | 4/2007 |
| JP | 2008082798 | 4/2008 |
| JP | 2009094280 | 4/2009 |
| JP | 2009277136 | 11/2009 |
| JP | 200915475 | 8/2010 |
| JP | 2010177062 | 8/2010 |
| JP | 2010283102 | 12/2010 |
| JP | 2010287860 | 12/2010 |
| JP | 2011174130 | 9/2011 |
| JP | 2011174709 | 9/2011 |
| JP | 2011199251 | 10/2011 |
| JP | 2011258693 | 12/2011 |
| JP | 2012026913 | 2/2012 |
| JP | 2013169836 | 9/2013 |
| KR | 100946238 | 3/2010 |
| KR | 101077441 | 10/2011 |
| WO | 9508125 | 3/1995 |
| WO | 02082448 | 10/2002 |
| WO | 2007056226 | 5/2007 |
| WO | 2009047585 | 4/2009 |
| WO | 2012014623 | 5/2015 |

OTHER PUBLICATIONS

Ashwin Lakshminarasimhan, Electromagnetic Side-Channel Analysis for Hardware and Software Watermarking, Master of Science in Electrical and Computer Engineering; Sep. 2011.

Y.P. Zhang, Duixian Liu, Antenna-on-Chip and Antenna-in-Package Solutions to Highly Integrated Millimeter-Wave Devices for Wireless Communications, 2009, vol. 57 No. 10.

\* cited by examiner

INTEGRATED CIRCUIT WITH ELECTROMAGNETIC ENERGY ANOMALY DETECTION AND PROCESSING

CROSS REFERENCE TO RELATED APPLICATION

This patent application is a Continuation of U.S. patent application Ser. No. 13/410,909 filed Mar. 2, 2012 pending. This patent application is related to and claims priority from U.S. Provisional Patent Application Ser. No. 61/464,262 filed Mar. 2, 2011 and U.S. Provisional Patent Application Ser. No. 61/574,250 filed Jul. 29, 2011 respectively and being incorporated into this document by reference thereto. This application is further closely related to a co-pending U.S. Ser. No. 13/410,797 entitled "SYSTEM AND METHOD FOR PHYSICALLY DETECTING COUNTERFEIT ELECTRONICS", published as U.S. Pub. No. 2012-0226463 A1 on Sep. 6, 2012. This application is being assigned to the assignee of the present invention and the disclosure of this co-pending application is hereby incorporated by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

FIELD OF THE INVENTION

The present invention relates, in general, to integrated circuits and, more particularly, the instant invention is related to integrated circuit with electromagnetic energy anomaly detection and processing.

BACKGROUND OF THE INVENTION

Detection of anomalous circuit characteristics is the domain of both quality control as well as trusted computing. This is a trend in technology to ensure that devices being used in an application are the intended devices. In addition, detection of anomalous circuit characteristics can be accomplished using different modalities, and several of these modalities have not been described previously for this purpose.

Miniaturization and Integration are continuing trends in technology that decrease the size of a device while maintaining its operational characteristics. When applied to electronic diagnostic equipment, this can allow for the more convenient use of that equipment, the more efficient use of space in space constrained environments, and retrofitting.

The components used in circuit boards are especially susceptible to counterfeiting and tampering. Counterfeit electronic and electrical components have found their way into the supply chain in increasing numbers. Counterfeiting occurs at the die, part, device, board and fully assembled product level. With the increasing complexity of counterfeiting and circuit tampering new detection and mitigation options have been needed for some time.

Prior to the conception and design of the instant invention, efforts have been made to inspect and screen counterfeits. However, a solution has not existed to detect if a counterfeit component was introduced onto a circuit board during rework or to have an on-board mechanism that could detect the installation of a counterfeit whether that counterfeit was introduced during the manufacturing process or at a later stage.

Prior to the instant invention all of the techniques are either superficial or extremely expensive and none of them are installed in-situ with the circuitry that needs to be monitored. Of superficial techniques, the simplest is visual inspection, but as counterfeits have become increasing sophisticated these techniques have become less reliable. In contrast, reliable techniques that are in existence are expensive or are destructive in nature.

One of the methods of choice for tampering with the integrated circuit at a die level, is the Focused Ion Beam (FIB). An astute reverse engineer can use FIBs to create, modify, or remove connections within an integrated computational or data storage asset to affect its operation. Whether these changes are malicious or simply part of a manufacturer's approach to cost savings, capabilities of detecting any modifications or changes to parts are of the utmost importance.

As noted, FIBs are a very effective tool to modify integrated circuits. The ability of these systems to ablate dielectric, metal, and substrates by bombarding the surface with $Ge^+$ ions can cut electrical connections, create additional unauthorized features, and implant ions to create gates and transistors. FIBs can also be used in conjunction with gas sources to deposit layers of metal or other dielectrics using a variation on ion induced chemical vapor deposition. This gives a talented engineer the ability to deconstruct a non-volatile computational die (such as one found in a CPLD [Complex Programmable Logic Device] or FPGA) and adjust the bit patterns or hard-wired circuit elements. However, there are some tell-tale signs of using FIBs to modify a semiconductor die.

FIBs are inherently destructive as they irrevocably affect the crystalline structure of the die on which they are used, and result in an amorphous structure when used for deeper milling, especially with silicon. 1) FIBs inevitably leave a $Ga^+$ doping residue embedded in the substrate. 2) For buried devices or lines, one must first mill, then modify the device, then refill the dielectric. This changes propagation, permittivity, and group delay of internal signals as well as radiated emissions. From a computational point of view, these modifications may not necessarily affect the noticeable digital operation of the device in question, though they certainly could introduce additional delays, and affect timing constraints. From the point of view of electromagnetic emissions, however, these introduced defects are precisely the sort of things that affect trace (and consequently radiator) length, engineered electromagnetic interference (EMI) protection, grounding and terminating resistors, carefully controlled transistor junction length and transconductance, specific dielectric permittivity, isolation of intentionally suppressed or inherent low-level electromagnetic emissions, etc. In fact, even effects introduced by inherent process variations are so pronounced within modern technology nodes that the modeling and iterative analysis to control these effects are now considered the most difficult element of the design process. For example, even modest levels of increased capacitance (femtofarad levels) generated from line width variations during manufacturing are capable of increasing crosstalk, ground bounce and delay at appreciable levels in modern circuits. In the spectral domain, this can drastically affect the strength, frequency, phase, harmonic content, and bandwidth of an emission. In the time and time-frequency domain, the phenomenology can be even more distinctive.

Thus, there is a need for a device capable of detecting anomalies due to counterfeiting, aging, discrete events that may degrade a component or tampering at the part and a die level of the integrated circuit or other complex semiconductor based devices and assemblies.

SUMMARY OF THE INVENTION

This present invention discloses novel application of utilizing unintended emissions to detect anomalous circuit characteristics that can be caused intentionally (e.g., substituting counterfeit parts for genuine or authentic parts; tampering with a genuine device to introduce unauthorized functionality; replacing genuine functionality with stub functionality) in a miniaturized and integrated fashion or unintentionally such as aging of parts by natural or intentionally induced processes, part degradation that may be induced environmentally or due to special events. As miniaturization and integration becomes more successful, it allows for this additional capability to be incorporated into new devices and to add this constant monitoring capability to existing devices by taking advantage of unused space that was heretofore unusable. Miniaturization also makes parts more susceptible to aging, environmental effects and damage from events such as reverse polarity, lightning strikes etc., making this technology more important as the protected and protective devices co-miniaturize.

The invention further provides an integrated circuit including an antenna, a die manufactured from a semiconducting material, an RF energy collection and processing means disposed on or within said die and including at least a receiver and a processing means, an input configured to supply power to said RF energy collection and processing means and an output for operative communication by said RF energy collection and processing means. The integrated circuit is configurable and operable to provide at least one of tamper detection, anti-tamper monitoring, degradation monitoring, health monitoring, counterfeit detection, software changes monitoring, firmware changes and monitoring.

The invention also provides a stand alone integrated circuit that can be installed on or near electronic parts of interest to monitor the emissions of nearby parts to track degradation, tampering, counterfeiting during rework or any other anomalous changes to the circuit.

OBJECTS OF THE INVENTION

It is therefore an object of the invention to provide an integrated circuit with electromagnetic energy anomaly detection and processing.

Another object of the invention is to differentiate counterfeit integrated circuits from genuine integrated circuits on the basis of their unintended emissions.

Another object of the invention is to detect anomalies and differentiate between anomalies that are caused intentionally and those that are due to circuit aging.

Another object of the invention is to detect tampering of integrated circuits.

A further object of the invention is to detect tampering caused by focused ion beams (FIBs) and other technology for revising integrated circuit.

Another object of the invention is to detect tampering of a circuit board due to tampered parts introduced to the circuit board.

Yet another object of the invention is to detect electromagnetic signature changes in a device when the software operating on the device changes.

Another object of the invention is to detect if the software installed in an integrated circuit has changed.

A further object of the invention is to detect electromagnetic signature changes in a device when the software operating any subassembly or component on the device changes.

Yet another object of the invention is the detection of firmware changes in an integrated circuit.

Another object of the invention is the detection of software changes at the board level.

Another object of the invention is the detection of embedded software changes.

Another object of the invention is to miniaturize the sensors and computational requirements for this technology such that they can be integrated at multiple levels with the device being protected.

A further object of the invention is to enable retrofitting of existing systems with integrated anti-anomaly systems.

Still another object of the invention is to enable continuous monitoring of protected systems for intrusion detection.

Yet another object of the invention is to detect counterfeit devices when they are introduced into a larger sub-assembly after servicing.

It is an object of the invention to reduce vulnerability of devices to introduction of unauthorized functionality.

Another object of the invention is to reduce vulnerability of devices to the elimination of trusted computing functionality.

Yet another object of the invention is to detect software intrusions that degrade functionality.

Another object of the invention is to detect software intrusions that add functionality, or alter already available functionality.

Yet another object of the invention is to integrate anomaly detection at the die level.

A further object of the invention is to reduce vulnerability of devices to the elimination of embedded security measures.

An additional object of the invention is to provide both large scale and localized anomaly detection.

A further object of the invention is to provide an anomaly detection and discrimination method and apparatus that can be enhanced by complementary indicators.

Yet a further object of the invention is to detect anomalies in multiple integrated circuits simultaneously.

Still a further object of the invention is to detect tampering in multiple integrated circuits simultaneously.

Another object of the invention is to detect and report anomalies to the circuit being protected.

A further object of the invention is to detect and report anomalies to the subsystem housing the anomalous integrated circuit.

Still another object of the invention is to improve the reliability of anti-counterfeit measures.

Yet another object of the invention is to improve the reliability of anti-tamper measures.

Another object of the invention is to monitor nearby electronics on a board for any anomalies.

BRIEF DESCRIPTION OF THE VARIOUS EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

For the sake of reader's convenience, the following description is repeated from the co-pending U.S. Ser. No. 13/410,797 entitled "SYSTEM AND METHOD FOR PHYSICALLY DETECTING COUNTERFEIT ELECTRONICS", published as U.S. Pub. No. 2012-0226463 A1 on Sep. 6, 2012. Now in a reference to FIGS. 8-11, there is provided a system, generally designated as 10, for differentiating between a counterfeit and genuine condition of an electrically powered device 2. The device 2 includes but is not limited to at least one of a discrete component, integrated circuit (IC), circuit board, circuit board assembly populated with electronic components, subsystem, system, electronic device and electrical device using electronic components for operation. All of these devices, under power, emit energy, either intended or unintended.

The foregoing description will be focused on emission of electromagnetic energy and, more particularly, the emission of electromagnetic energy being in a Radio Frequency (RF) spectrum, which is typically referred to in the art as frequencies below 300 GHZ, although infrared and infrasonic emissions are also contemplated by the instant invention.

The described invention takes advantage of the fact that all electrical components, when powered, give off electromagnetic emissions. The emissions are defined by the radiating structures that are doing the emissions.

The electromagnetic emissions will change due to anomalies that may occur over time to include, but not limited to aging, degradation, counterfeiting or tampering. The electromagnetic emissions changes are not only limited to hardware changes, but also software or firmware changes. These changes in a software in a die, integrated circuit, nearby part on a board or several nearby parts on a board can be intentional or unintentional. Whatever the cause the described instant invention significantly contemplates detection, monitoring, inspecting and screening for both hardware and software changes from a known anticipated state.

There must be a source of energy that energizes an electronic component, a board, a system or a subsystem to be tested or monitored. The mechanism of energizing can be simply powering the device, inputting an oscillating signal into the device or illuminating the device with electromagnetic energy. The directly injected or connected oscillating signal and illumination source can be a single tone, multiple tones or multiple frequencies or complex with modulation and or timing parameters applied.

The typical on-board component in an operational state already has all of the inputs preconfigured whether it is a die, an integrated circuit or an entire board itself. A preferred embodiment encompasses the use of the invention for the diagnostic or test modes of a device as well as the fully up and functional mode of the device.

The energized item that is being inspected, tested or monitored directly or indirectly must provide a mechanism for transmission of the energy that is being radiated which is governed by the internal design of the item being inspected. Typically, the source that powers the device is the energy which powers the electronics though as noted it can be an oscillating signal such as a clock, clock signal, signal, frequency input, frequency reference, signal generator, frequency generator or other oscillating sources that are known in the art. The mechanisms and structures, that transfer the energy to a radiating element within the item being tested, are integrated circuit dies, wire bonds, semiconductor traces, board traces, wires, cables or structural capacitive or inductive coupling. The radiating element may be an intentionally radiating antenna or an unintended antenna, that due to physical dimensions, acts as a reasonable antenna. If the internal parts of the electronics, whether they are a discrete semiconductor, an integrated circuit, a printed circuit board, a circuit board assembly or a product, are functioning differently, the electronics will give off a different electromagnetic signature and counterfeit parts can be differentiated from genuine parts for inspection or screening purposes.

Figure 8:
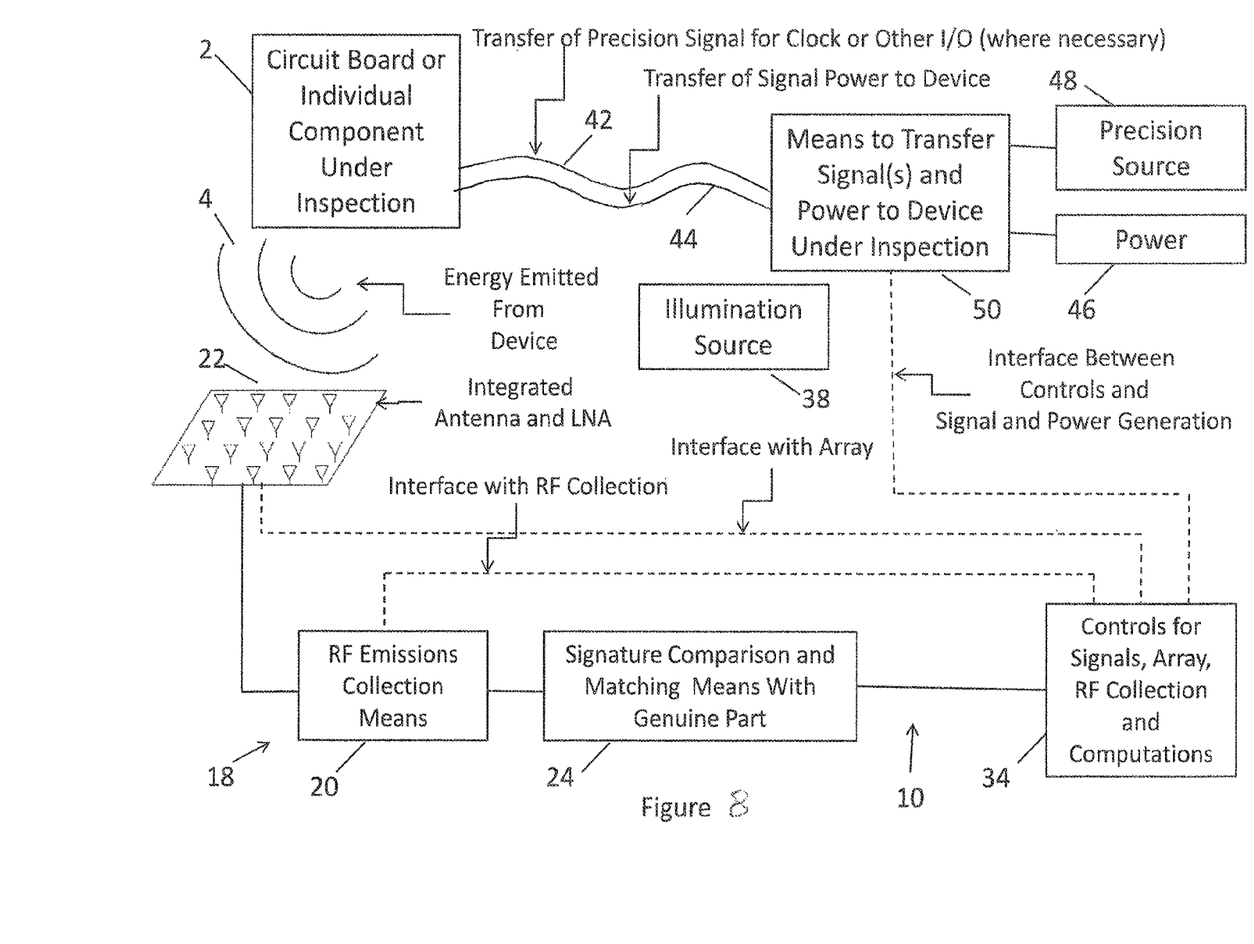
FIG. 8 is a schematic block diagram of a system for inspecting or screening electrical or electronic devices.

The system 10 includes means, generally designated as 18 for determining such condition of the electrically powered device 2, the condition defined by emission characteristics (or a signature) of RF energy 4 from the device 2 under test or inspection.

One essential element of the means 18 is a first means or emissions detection apparatus, generally designated as 20, which, in accordance with a presently preferred embodiment, is provided for at least one of sensing, processing, and algorithmically matching at least one emission of the RF energy for at least one of inspecting and screening the electronic device.

The detailed description and operation of the first means 20 are best shown and described in the U.S. Pat. No. 7,515,094 and in U.S. Pat. No. 8,063,813, both issued to Keller, III; in the U.S. patent application Ser. No. 12/551,635 filed on Sep. 1, 2009 and entitled "ADVANCE MANUFACTURING MONITORING AND DIAGNOSTIC TOOL", now issued as U.S. Pat. No. 8,643,539 B2 on Feb. 4, 2014; and in the U.S. patent application Ser. No. 13/344,717 filed on Jan. 6, 2012 and entitled "System and Method for Physically Detecting, Identifying, Diagnosing And Geolocating Devices Connectable To A Network", published as U.S. Pub. No. 2012-0179812 A1 on Jul. 12, 2012 and now issued as U.S. Pat. No. 8,825,823 B2 on Sep. 2, 2014, all owned by the assignee of the instant invention and whose teachings are incorporated herein by reference thereto.

The first means 20 includes RF collection means coupled to an antenna 22. It would be understood that the RF collection means 20 includes a receiver that can be a general receiver or tuner and the general receiver can be a heterodyne or super-heterodyne receiver.

Many receiver embodiments are contemplated as a component of the RF energy collection apparatus to include as noted heterodyne or superheterodyne receivers, wideband crystal video receivers, tuned Radio frequency crystal video receivers, narrowband scanning superheterodyne receivers, channelized receivers, microscan receivers, acousto-optic receivers and the vast array of tuner technologies that may often be referred to as synonymous with receivers.

In another embodiment, the highly sensitive RF energy collection apparatus is a cryogenically cooled receiver.

The receiver can be improved by providing a broadband response. Though one embodiment focuses on emissions from 100 KHz to 6 GHZ the bandwidth can be reduced to 30 MHz to 1 GHz to capture the majority of emissions from the devices coming in to the facility.

Further sensitivity is achieved by lowering the noise figure of the system. In one embodiment the receiver has a modified front end with a Low Noise Amplifier (LNA) with an ultra-low noise figure.

In one embodiment the system has a noise figure of less than 5. In another embodiment the system has a noise figure of less than 1. In another embodiment the system has a noise figure less than 0.1.

From the receiver, the signature data will be sent to a processor. One embodiment is direct analog analysis. Though direct analog analysis is a described embodiment, the presently preferred manifestation is to use an analog to digital conversion (not shown) to convert the analog output of the receiver to digital output. The digital output is then sent to a signal processing apparatus.

One embodiment uses direct analysis of the analog signal into a digital output.

Another embodiment, where higher frequencies are required, utilizes a down conversion of the analog output prior to conversion to a digital signal.

In one embodiment, the highly sensitive receiver further uses Digital Signal Processing (DSP) to further enhance the sensitivity of the receiver.

In another embodiment, the RF energy collection apparatus utilizes DSP filtering techniques to prepare the collected data for further processing by DSP algorithms.

One embodiment uses a Fast Fourier Transform (FFT) to improve sensitivity of the receiver.

In another embodiment the FFT utilizes in excess of 1 Million points.

In another embodiment the FFT is implemented on an embedded chip within the RF collection apparatus.

Figure 9:
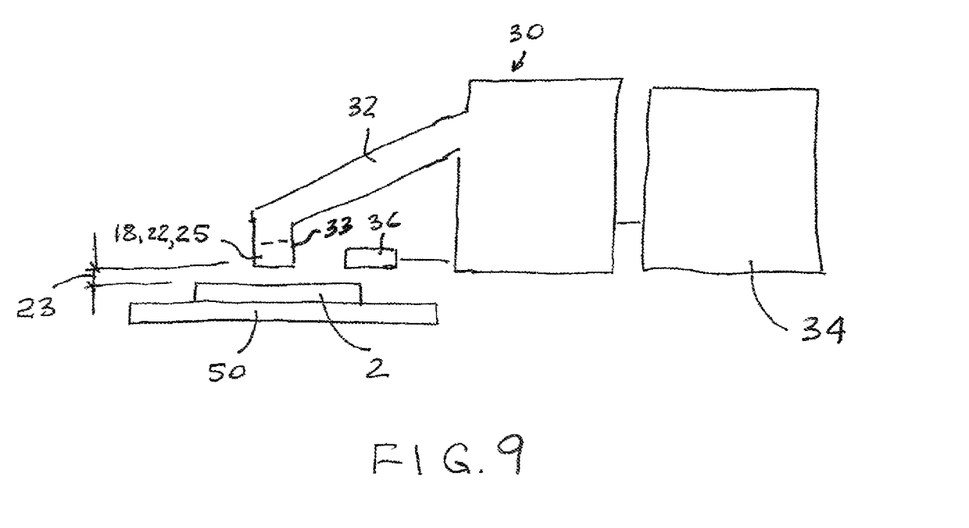
FIG. 9 is a schematic block diagram of the system of FIG. 8, particularly illustrating the precision signal input and a test apparatus.
Figure 10:
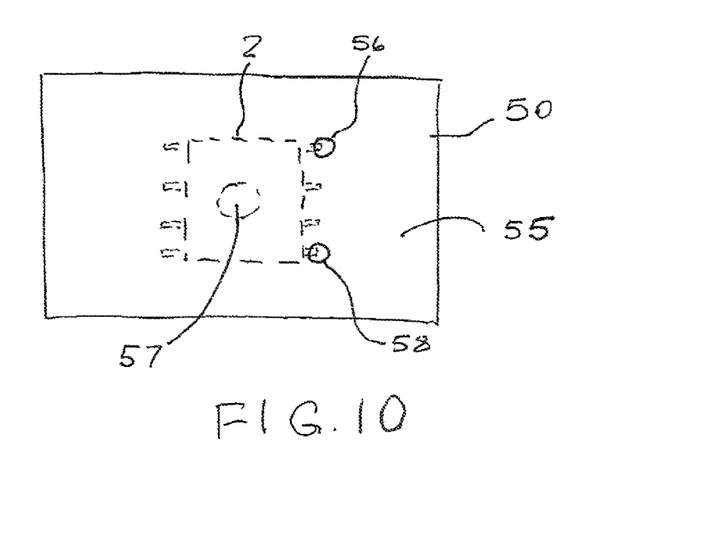
FIG. 10 is a planar view a test fixture employed within system of FIG. 8.

Now in a further reference to FIG. 9, preferably, such antenna 22 is an antenna array positioned a predetermined distance 23 above the device 2. When the device 2 is a small discrete component or an integrated circuit, the antenna array 22 is positioned stationary relative to the device 2 under test. The elements of the antenna array 22 are weighted via electronic steering to optimize the energy collected from certain parts of the circuit board or larger item under test. In the case of a single component that is being tested no weighting is necessary or it could be weighted to enhance signature amplitude from the location of the component. In this embodiment the antenna array 22 provides constructive interference of the antenna pattern of each antenna in the array when the element is weighted to constructively enhance the gain on different areas of the board of interest to inspect individual parts on a board without the need for mechanical or robotic steering. When the device 2 is of a larger size, for example such as a printed circuit board assembly populated with electronic components, a single antenna element or much smaller number of elements integrated to the end of the robotic arm 32 or a compact version of the antenna array 22 is positioned for movement, by way of an electronically controlled mechanical or robotic steering, over the surface of such printed circuit board or the printed circuit board is mounted for movement beneath the antenna array 22.

The antenna array 22 also includes an integrated Low Noise Amplifier (LNA) 25. The advantage of integrating LNA 25 is in enhanced sensitivity of the entire system and enhanced level of the signatures given off by the device 2. The antenna 22 and LNA 25 may be mounted within an integrated circuit (IC) to perform electronically steered detection of counterfeits.

To further enhance emission signatures, a low noise amplifier 25 with a noise figure of less than one can be employed to better approach the theoretical room temperature sensitivity of the system 10.

In another embodiment, a compact antenna array 22 with integrated LNAs 25 or a single compact antenna 22 that is approximately the size of the components one wishes to inspect on a board with a single element may be integrated onto a robotic arm 32 for inspection of electronic items.

In yet another embodiment, the antenna/LNA array tips suitable for a robotic arm 32 may be interchangeable based on the performance parameters sought for the inspection of certain electronic devices or components.

The predetermined distance 23 essentially depends on the desired success rate of detecting counterfeit devices, the type of devices being inspected or screened and the sensitivity of the antenna array 22 and the RF collection means 20.

For the case of detecting electronics outright or identifying electronic devices at range, most of the radiative energy components are attenuated to a level that makes them extremely challenging to detect. When the goal is to screen or inspect for counterfeit electronics, the detection apparatus can be placed at extremely close range to the components, boards or systems being tested. This invention focuses on that environment and the advantages of the extra information provided about the electronics being screened or inspected when in the near environment of the RF collection means. Accordingly, it is presently preferred to position the end of the antenna array 22 between about one micrometer and about one centimeter from the surface of the device 2. Furthermore, the invention contemplates use of an active illumination source 38 configured to illuminate the device 2 that is at least one of detected, inspected or screened with free field RF energy to further enhance the emissions signature of the device 2 under test.

When antenna array 22 is mounted for a stationary electronic steering of the beams of the array or for a movement relative to the device 2 under test, the means 18 provides an automated mechanism 30 for collecting the RF energy from the device 2. By way of one example only, such automated mechanism includes a robotic arm 32 and a general controller 34 configured to control movement of the robotic arm 32. The automated mechanism 30 may further include a sensor 36 for setting such predetermined distance 23, particularly, when components within the device 2, for example such as a printed circuit board assembly, have variable heights.

It is to be understood that such automated mechanism 30 for control of the robotic arm 32 used to position the means for collecting the RF energy may be provided as a stand alone system or may be incorporated into a manufacturing line (not shown) for a printed circuit board assembly or any apparatus that allows for at least one of input, output and power connections.

It is to be further understood that although the positioning of the antenna array 22 or a single element antenna above the device 2 under test is depicted to be in the vertical direction other orientations and manipulations can be undertaken by the robotic arm to access difficult to reach spaces in fully assembled products or complex assemblies. In another embodiment, different orientation of the antenna array 22 may be utilized based on an assessment that the device 2 being inspected tends to radiate the RF energy being collected from that direction. It follows, based on the conventional wisdom in the art, other special orientations are also contemplated by the instant invention for a number of other test specific orientations.

Unlike conventional full electrical tests, the instant invention is based on activating limited or baseline functionality of the device 2 in order to screen for and inspect for counterfeits. In the case of circuit board, printed circuit board assembly or partially or fully assembled products, typically it is sufficient to provide power to the board. All of the inputs and outputs are not necessary, though clearly those skilled in the art would be aware that connecting all of the inputs and outputs might potentially serve to improve the statistical screening success of the instant invention. The board in this state will undertake it's basic functions and the RF emissions collection means 20 is able to collect enough differentiable information to screen for counterfeits and tell if the board itself is genuine or a counterfeit and if a specific component on the board is a counterfeit.

Now in a further reference to FIG. 8, in the case of components/device 2 that are intended to be integrated into a circuit board prior to the board existing manufacturing line, one embodiment is directed to simply providing power signal 42 to the component/device 2 so as to only electrically turn the component/device 2 ON. Another embodiment is directed to only providing an oscillatory signal 44, preferably to energize the clock in input or output of the device 2 under test. In the presently preferred embodiment of the invention, the power signal 42 is combined with the oscillatory signal 44. Such oscillatory signal 44 is preferably a monotonic oscillating signal, but can be also provided as a multi-tone input or a modulating or modulated oscillating signal. The use of multi-tone input injection aids in developing cross-modulated and intermodulated responses that translate into unique signatures for a counterfeit versus a genuine device. Furthermore, use of multi-tone injection aids in developing non-linear responses that translate into unique signatures for counterfeit versus genuine devices.

The method of energizing the device 2 with a power input signal 42 and oscillator input 44 applies to semiconductor devices, integrated circuits, board level devices such as surface mount or through whole parts, sub-boards or daughter boards, entire circuits boards, assemblies of multiple boards or even whole products. Of importance, is to provide power input 42 to power the device 2 as a baseline and a single simple monotonic oscillatory input 44 to energize basic device functions that will then, when active, create electromagnetic emissions for capture by the RF collection means 20 and antenna array 22 or individual antenna positioned in the near vicinity to the device 2 and analyzed against an expected standard or baseline characteristics of a genuine part.

In an example of the device 2 being the IC part, the power input 42 will turn the IC ON and the oscillating input 44 will enable internal circuitry by providing an oscillatory input into a pin or port on an IC specification sheet that is often referred to as a clock input or Clock In, but would not cause more complex operation of the IC, since no other inputs are being energized. Another example would be providing the oscillatory input only signal, communications or secondary clock inputs with the primary focus on energizing the underlying circuitry of the IC.

Accordingly, the system 10 provides a power signal source 46 and an oscillator signal source 48. The oscillator signal source 48 may be termed as crystal oscillator, ceramic oscillator, time standard, signal, signal generator, frequency reference or other similar terms that are typical in the art. Although each of these sources may have differences when analyzed in detail, each of them fundamentally provides a mechanism to provide an oscillatory input to the device 2.

It has been found that the manner in which the integrated circuit responds is dependent on the quality of the oscillator input 44 that is used to drive either the clock inputs or the signal inputs of the semiconductor device 2.

Satisfactory results have been achieved by using temperature compensated Crystal Oscillator (TCXO), microcomputer compensated Crystal Oscillators (MXCO), Oven Controlled Crystal Oscillator (OCXO), small atomic frequency standards (Rubidium (Rb) and Rubidium Oscillators (RbXO)), and high performance atomic standards such as Cs all provide accuracy in excess of $10^{-4}$. In the presently preferred embodiment the precision of the oscillating signal 44 exceeds $10^{-8}$, and the source 48 is a small atomic frequency standard oscillator. Thus, the oscillator input source 48 is hereafter referred to as a "high precision signal source" and the oscillator input 44 is hereafter referred to as "high precision oscillator signal". The high precision signal further has a frequency thereof being consistent with input requirements of the device 2.

The oscillator source 48 described above needs only be used to energize the device 2. Though more spectrally rich emissions can be derived by adding modulations or complex timings to the manner in which the device is driven, the presently preferred embodiment limits complexity to only energizing the device input such as the clock or other signal input and creating an emissions pattern that provides information as to whether the condition of the device 2 is genuine or counterfeit.

Another embodiment provides a second mechanism for allowing the oscillator source 48 to sweep over a frequency band while providing a means to measure the emissions of the device 2 simultaneously. One embodiment has the frequency sweep occurring continuously. Another embodiment uses a discretized sweep where only certain predetermined discrete frequencies over the band of interest are swept. The frequency swept over will depend on the anticipated inputs of the device 2 under test. In some cases, it may suffice to sweep over several Hz, in other cases over KHz of bandwidth, in other cases over MHz of bandwidth and in other cases over GHz of bandwidth. The invention is capable of covering any of these ranges, but for cost concerns the bandwidth is typically limited to ranges that are effective, but not exhaustive. It is clearly contemplated that any of these bandwidth intervals could be used and are anticipated by the invention.

In addition, the instant invention contemplates energizing inputs outside of the range specific of the device being driven. In this case, the genuine part may have been developed to have a wider input range than actually specified to provide a more robust part whereas the counterfeit part may not have that capability. In either case, responses such, as non-linear responses that differ between the parts, are readily translated to an adequately configured RF collection means 20.

Further complemented by this invention is the altering of the amplitude of oscillator input to device inputs such as clock inputs, signal inputs and other inputs that may have been defined by the manufacturer of the device 2.

In another embodiment, the amplitude is not only altered, but amplitude modulation is applied.

In addition to energizing inputs, the instant invention contemplates energizing output(s). Driving the outputs also creates device architecture responses. For instance, a genuine part might have filtering or Electrostatic Discharge (ESD) protection in the device that a counterfeit part does not have. The counterfeit part may "light up like a Christmas tree" in the RF spectrum when some standard protection is not included in the circuits by a counterfeiter who is trying to save costs.

When the device 2 is a printed circuit board, printed circuit board assembly or any larger device, the invention contemplates simply connecting power input 42 to the device without the need to drive any of the other inputs or outputs of the device. The invention also clearly contemplates the use of power input 42 and oscillator input 44 to respective inputs (or outputs) of such device 2. For smaller components, such as discrete semiconductors, integrated circuits and the like, the instant invention provides a test fixture 50, best shown in FIGS. 7 and 9-10, which provides means for transferring such input 42 and 44 to the device 2. For example, such test fixture 50 may be a zero insertion force socket configured to receive such device 2 and pre-configured to apply such input 42 and 44 thereto. In another example, the test fixture 50 may be any specialized apparatus that facilitates an effective manner or applying power to the power pin and an oscillating signal to other desired inputs (or outputs). Grounds are also typically connected as well. Or, the test fixture 50 may simply provide two surface level contacts 56, 58 and means for temporarily securing the device 2 positioned thereon. For example, such temporarily securing means may be a vacuum generating device 57 positioned below the surface 55 of the test fixture 50.

A second essential element of the means 18 is means 24 for comparing and matching the collected RF energy to a set of parameters identified for a baseline configuration of a genuine device 2. It would be understood that means 24 includes at least one processor, though it also contemplates other hardware or firmware manifestations of verifying a match with the anticipated parameters.

Means 24 includes at least one algorithm to match the data collected to the expected signature for the device 2. The presently preferred embodiment uses more than one automated algorithm. The presently preferred embodiment utilizes several algorithms that match mutually exclusive parameters of the RF energy emission signature. In this manner the ability to match the collected signature to the expected signature is improved. The weighting of these algorithms favorably improves the ability to detect poor quality parts to include counterfeit parts.

Thus, means 24 includes at least one of Harmonic Analysis, Matched Filter, non-harmonic correlation, timing correlation, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending algorithms.

In the clustering analysis, statistics are measured and generated on key electromagnetic emissions of the sampled components. A total of N statistics are measured on each of M components, in turn, to develop M sets of N statistics. Each statistic is then assigned a unique axis in N-dimensional space and the measured statistics for each of the M measured components are stored. A Hierarchical Agglomerative Clustering (HAC) algorithm is then applied to segregate clusters in the spatial distribution. The identified clusters represent component sets that differ in their performance parameters beyond the typical distribution in manufacturing. Any illegitimate components inserted into the sampled set are necessarily revealed as a separate cluster in the analysis.

The HAC algorithm operates iteratively, wherein successive iterations agglomerate (merge) the closest pair of clusters (or data points, on the first iteration) by satisfying some similarity criteria. Typically, this similarity is defined by a measure of distance between clusters. However, many of the measured features, which represent the axis in N-dimensional space, are distinct and unrelated. The Mahalanobis Distance, a metric which corrects for dissimilar scales through an assessment of covariance, conceived for this exact purpose and is used as the basis of similarity between clusters in this analysis. The Mahalanobis distance $d(\vec{x},\vec{y})$ is defined between two vectors $\vec{x}$ and $\vec{y}$ as, $$d(\vec{x},\vec{y}) = \sqrt{(\vec{x}-\vec{y})^T S^{-1}(\vec{x}-\vec{y})},$$

where S is an estimate of the joint covariance between the two vectors. In the current application, each vector is represented by a position vector in N-space, and the joint covariance between two clusters is estimated from their constituent data points. Normalizing to the joint covariance matrix of the two clusters gives the Mahalanobis distance the essential property of scale-invariance.

Clusters are extended bodies in N-dimensional space, this requires that the distance metric endpoints be well-defined. While there are several "linkage" options available, such as the minimum data point distance between two clusters (termed single linkage) or the maximum point-wise distance (termed maximal linkage), the place to put the ruler endpoints is at the mean of each cluster in N-space. This linkage method allows the covariance of each cluster to be considered in the Mahalanobis distance metric. It also reduces the computation necessary, since cluster means can be updated in a running fashion without having to iterate over all the constituent data points.

The stopping criterion of the algorithm (i.e. the separation distance threshold which precludes further agglomeration) is determined through an assessment of the manufacturing tolerances observed during analysis. Clusters are developed and nested by similarity in multiple tiers and an analysis of these tiers provides insight into the existing variance.

Information loss, as the number of clusters increases, is used to identify the optimal stopping criterion. The Symmetrized Kullback-Liebler Divergence (SKLD) is a prime measure of information loss. The SKLD is defined for two models P and Q as, $$D(P\|Q) = \sum_i P(i)\log\frac{P(i)}{Q(i)} + \sum_i Q(i)\log\frac{Q(i)}{P(i)}.$$

The SKLD provides a measurement of the information difference between two models (i.e. two tiers of HAC). Plotting D(P∥Q) for several tiers usually illustrates an inflection point. The optimal number of clusters is identified just below the inflection point.

Figure 11:
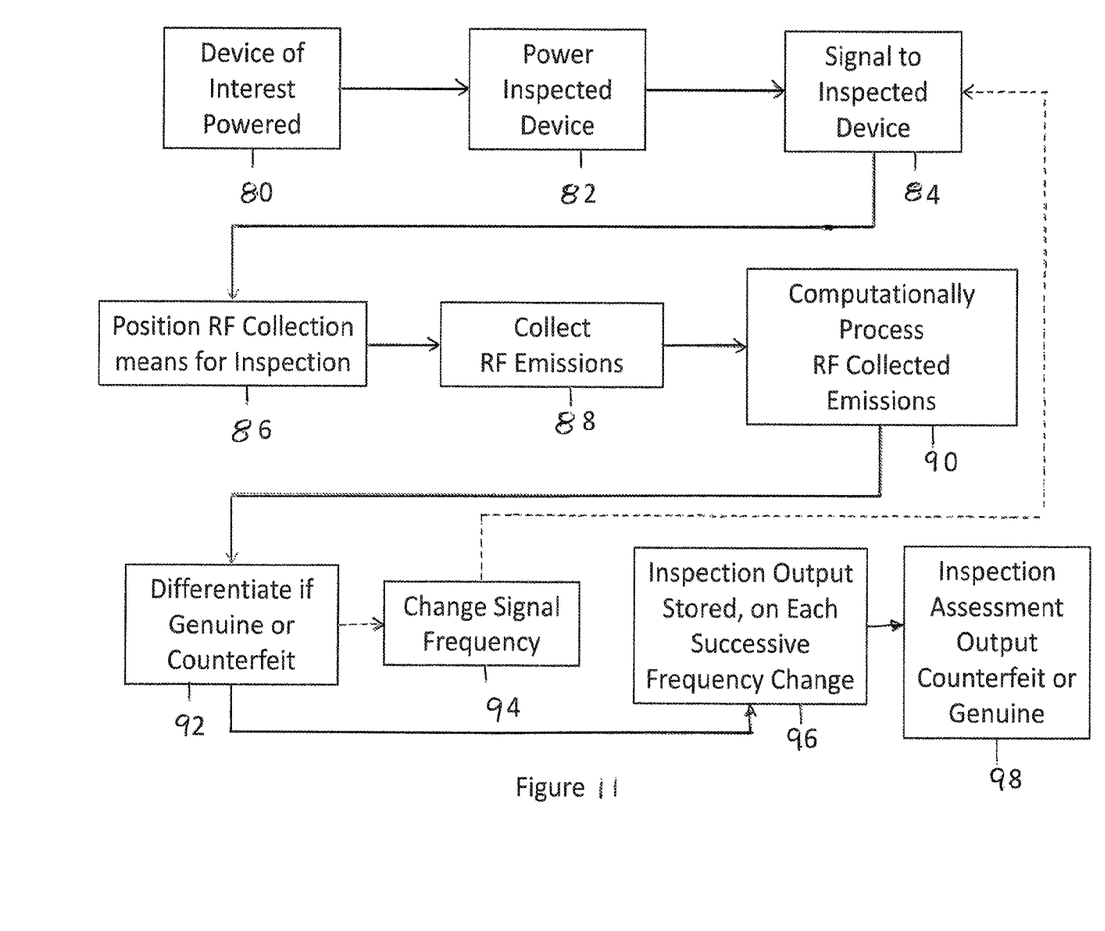
FIG. 11 is a flow chart of a method for inspecting or screening electrical or electronic devices.

Now in a further reference to FIG. 11, the method of inspecting or screening for counterfeit electronic or electrical device 2 starts with powering the device 2 at step 80, inputting a power signal in step 82 and inputting an oscillating signal at step 84. Then, the RF collection means 20 is positioned in step 86 and is operable to collect RF emissions, in step 88, from the device 2 injected with power signal 42 and oscillating signal 44. Collected RF emissions are computationally processed at step 90 which includes the step of comparing and matching signatures of collected RF emissions 4 with RF emission signature characteristics for a genuine device 2 determine by various methods, for example sampling of a plurality of devices 2, manufacturing specifications and the like methods.

It is contemplated to use various automated algorithms within the step 90. The step 90 may include the step of obtaining discrete wavelet transform coefficient statistics or the step of obtaining relative phase measurement and comparing obtained phase measurement to anticipated phase measurements. Step 90 may also include the step of using at least one of a clustering algorithm a Hierarchical Agglomerative Clustering (HAC) algorithm.

The Wavelet transform is a multi-resolution analysis technique employed to obtain the time-frequency representation of an analyzed emission. It is an alternate basis function to the Fourier Transform and is based on the expansion of the incoming signal in terms of a function, called mother wavelet, which is translated and dilated in time. From the computational point of view, the Discrete Wavelet Transform (DWT) analyzes the signal by decomposing it into its 'approximate' and 'detail' information, which is accomplished by using successive low-pass and high-pass filtering operations respectively.

The high-pass 'detail' coefficient outputs of these multiple decompositions, as features in a signal classification, have been found advantageous for use in the instant invention. DWT has been found beneficial for classifying near-identical device emissions based on a measure of skewness obtained by applying the Wavelet Transform on frequency domain information. DWT analysis is applied on the frequency domain emission data of each emission within the intersection ∩E defined. Average energy at each of the different detail-coefficient scales is computed and each resulting value shall be retained for use in classification.

The phase information of identified emissions is used to provide a particularly sensitive assessment of circuit modification. Signal phase (and, in turn, emission phase) is easily modified through slight variations in either distributed or localized impedance within a given circuit. Phase information is therefore highly relevant when seeking to identify subtle circuit changes.

In a relative phase measurement algorithm, phase measurements are performed on each emission relative to another (or several other) emission, due to the lack of a known reference. Any set of static frequency emissions are necessarily repetitive within a time-domain envelope and, therefore, contain a repetitive phase relation at a certain point within this envelope, which is named as the reference time $t_{ref}$. If a measurement of the signals is made at some other time, $t_M$, during the repetitive envelope, the phases at $t_M$ will not usually appear to correspond in any obvious way to those of $t_{ref}$ due to the time difference $t_{ref}$-$t_M$. The identification of $t_{ref}$ from a measurement made at $t_M$ allows a shift of the time reference back to $t_{ref}$ and, in turn, an alignment of the phases such that a single, repeatable measure of relative phase relation may be taken.

Nominally, harmonics are expected to have a relative phase measurement of 0°, while inter-modulation components are expected to have relative phase measurements of either 0° or 180°. Precise phase relationship of harmonics and inter-modulation components often varies from these nominal expectations and may be effectively used to characterize circuitry. The deviation in relative phase from the nominal value is attributed to the small changes in circuit reactance at the varying frequencies of the analyzed harmonics.

Some methods rely on frequency domain phase detrending, which generally has drawbacks in the computational ambiguities associated with the modulo 2pi calculations. Other methods rely on the use of a reference signal to establish a precise reference time off of which to measure. Given these drawbacks, neither of these approaches is an optimal methodology for emission measurement. However, when the relationship is known a priori (that is, if the signals are harmonics—0° shifts—or inter-modulation components—0° or 180° shifts), one may minimize a function of the difference in a phase on each signal from the expected values using a single time delay offset as the independent variable. This approach, taken by the inventors provides the framework to analyze the phases of a harmonic and an inter-modulation emission content for variations between measured ICs and other devices.

Each of the emission patterns identified as belonging to the harmonic or the inter-modulation relationship is assessed to determine precise relative phase measures.

It has been found that the ANN algorithm excels in learning trends occurring in large databases, combining information in a manner optimized to either classify or function fit.

There are several desirable aspects to neural network-driven data analysis. The RF emission data contains a rich and diverse set of characteristic signatures for persistent monitoring and diagnosis. To achieve the most sensitive, accurate and reliable results, as much of this information as possible is included in the analysis. However, the fact that the phenomenology of RF emissions consists of a combination of broadband and narrowband characteristics makes it difficult to determine a robust RF processing technique appropriate to the task. ANNs are highly skilled at combining large or diverse information into easily understood quantities. Additionally, simply providing ANNs with useful data and instructions pertaining to the desired categorization obtains solutions to complex problems. This feature allows the use of multiple RF techniques in conjunction, utilizing all relevant information to ultimately distinguish one unique signature from another.

Next at step 92, the computationally processed RF emissions are discerned to determine a condition of a genuine or a counterfeit device 2. If required, the frequency setting of the oscillating signal may be changed in step 94 and steps 84 through 92 are repeated. Each measured response is stored at step 96 and the responses are compared with each other to improve counterfeit inspection. The frequency change may be associated with different frequency amplitude settings and/or different relative phases between two or more signals. When at least two inputs are injected with the oscillating input 44, the collected RF emission data for each input is compared individually against the expected signature and injection into all inputs simultaneously.

Finally, at step 98, assessment of the condition of the device 2 is made so as to discern between genuine and counterfeit device 2. The step 98 of determining the genuine device 2 includes the step of analyzing at least one of frequency locations of emissions components, phases of emissions, cross-modulation and inter-modulation components generated by the internal circuitry, shape of any individual emission, quality factors of any individual emissions or timing characteristics of emissions.

The presently preferred method of inspecting or screening for counterfeit electronic or electrical device 2 further includes a step of establishing the baseline RF characteristics representative of the genuine device 2. Such step of establishing the baseline RF characteristics includes a step of large scale comparison of spectral emissions and a step of reducing the large scale comparison to narrowband comparisons and further reduction to a single scalar value based on the quality of the comparison match. The step of establishing the baseline RF characteristics may also include a step of obtaining local spectral power density statistics, wherein a plurality of semiconductors are sampled and discriminated based on localized statistical features measured on each of emissions common between sampled devices. The statistical features include at least one of Emission Frequency Location, Emission Peak Magnitude, Emission Phase Noise, Emission Symmetry, Skewness, and Emission Local Noise Floor.

This invention provides the necessary steps and specifics to simultaneously apply power and one or more than one oscillatory input and simultaneously measuring the RF emitted by the device 2 under these conditions, whether that emission 4 be conducted or radiated, to detect, screen, identify and inspect for counterfeit electronics.

The instant invention also uses the intended or unintended RF emissions 4 to characterize devices at a die or a substrate level. The introduction of free field EM field strengths at select frequencies where the device is measured to be emitting will amplify and/or alter the unintentional radiation characteristics of the device. This invention further contemplates an embodiment wherein an active illuminating source is used to enhance the emissions collected by the RF collection means. In this case, the power to the device is applied via the test fixture and the RF collection means collects the emitted energy. During this collection, the free-field illumination source is turned on to energize the circuit. Another embodiment encompasses the application of power and the oscillating signal via physical connection to the device being tested while the free field illumination is carried out and the RF collection apparatus collects the emitted energy. In this embodiment, the illumination source may illuminate using single frequency monotonic, multi-tone or complex modulated RF energy.

The introduction of EM field strengths via the illumination source at select frequencies may amplify and/or alter the unintentional radiation characteristics of the device. One advantage of the instant invention includes amplification of the RF emission signature to improve the ability to detect, inspect or screen counterfeit electronics.

The field strengths necessary to cause the described responses may not have to be so robust. Lower field strengths in some cases may enhance the emissions collected substantially. For example, oscillator instabilities at low field strengths can significantly alter the emission signature of such devices.

Figure 1:
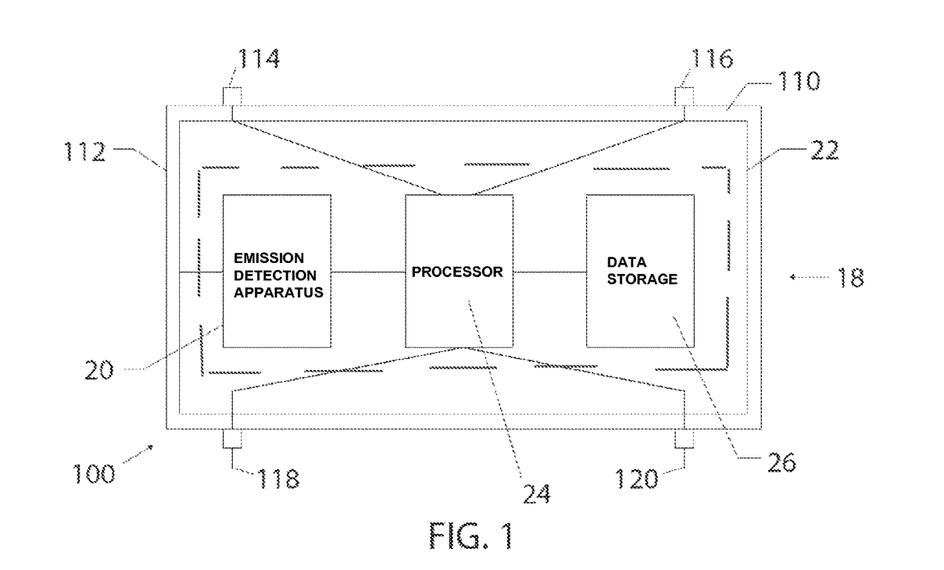
FIG. 1 is a schematic block diagram of an integrated circuit with electromagnetic energy anomaly detection and processing constructed in accordance with one embodiment of the invention.

Now in reference to FIG. 1, the instant invention provides an integrated circuit (IC), generally designated as 100. The IC 100 includes a die 110 manufactured from a semiconducting material, for example, such as a silicon but other materials are also contemplated herein. The RF energy collection and processing means 18, including emissions detection apparatus 20 and processing means 24, is integrated into the die 110. A data storage means 26, such as a memory, is also provided. The antenna 22 is shown as a loop antenna in FIG. 1. Other antenna types including but not limited to stacked loop, fractal, irregular loop, array of dipoles, parabolic antenna shape structure, Vivaldi antenna, equiangular spiral, skewed spiral, micromachined horn or waveguide structure, and the like devices known in the art are contemplated within the instant invention. As it will be explained further in this document, antenna 22 may be provided external to the RF energy collection and processing means 18 and even external to the die 110 or even the IC 100. The die 110 and RF energy collection and processing means 18 may be enclosed within an optional enclosure member 112 in accordance with conventional techniques of providing functioning ICs. An input connection 114 is configured to supply power to the RF energy collection and processing means 18. In operation, input connection 114 has a connection with a source of power (not shown). An output 116 is provided for operative communication by the RF energy collection and processing means 18. The output 116 is configurable to communicate plurality of information types from the RF energy collection and processing means 18. By way of one example only, the output 116 may be configured to indicate two states of the RF energy collection and processing means 18, whereby one state is indicative of an RF energy signature substantially matching a predetermined standard and whereby a second state is indicative of the RF energy signature deviating from the predetermined standard. Output 116 may be provided as an analog or digital input. A ground input connection 118 is also provided. The IC 100 may be further configured with an optional connection 120 for programming the processing means 24 and/or communicating RF emission related data for storage in the memory 26. Other input and output connections are contemplated based on specific applications and requirements.

In operation, the IC 100 is simply mounted onto any suitable member, for example, such as a substrate 206 of FIG. 2, printed circuit board assembly 300 of FIG. 5, to be described below in this document, robotic arm 32 and the like devices containing electronic components or used for detection of electronics components. The IC 100 is then operable in accordance with above described embodiments in a plurality of applications to be described further in this document.

Figure 2:
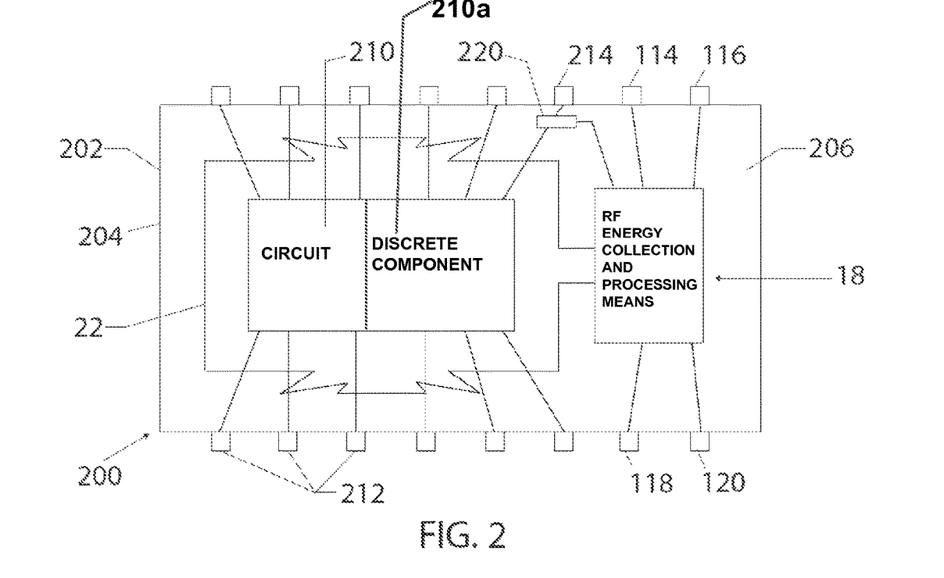
FIG. 2 is a schematic block diagram of an integrated circuit with electromagnetic energy anomaly detection and processing constructed in accordance with another embodiment of the invention and further incorporating the integrated circuit of FIG. 1.

Now in reference to FIG. 2, therein is illustrated an IC, generally designated as 200. The IC 200 includes the above described RF energy collection and processing means 18, antenna 22 and inputs/outputs 112, 116, 118 and 120.

The IC 200 also includes at least one circuit 210 and/or at least one discrete component 210a positioned in proximity to the RF energy collection and processing means 18. The antenna 22, shown by way of an example only as a loop antenna, is mounted to encase the at least one circuit 210 and/or at least one discrete component 210a. As it can be seen in FIG. 2, at least one section of the antenna 22 may deviate from a straight configuration.

The at least one circuit 210 and/or at least one discrete component 210a may be provided on another die 202, wherein the RF energy collection and processing means 18 is integrated into the die 110, or the at least one circuit 210 and/or at least one discrete component 210a and the RF energy collection and processing means 18 may be integrated into the same die 202. The IC 200 also includes a casing 204 and interconnections to input/output pins or terminals 212 and 214. Either or both dies 110 and 202 may be mounted on the optional substrate 206.

In operation, the RF energy collection and processing means 18 is responsive to RF electromagnetic energy emitted by at least one of the at least one circuit 210 and at least one discrete component 210a in accordance with above described embodiments depending on a particular application and/or requirements.

The instant invention contemplates that the IC 200 may be provided with means for destroying or disabling operability of the IC 200 in an event of at least one of hardware, firmware or software tampering, counterfeiting and even abnormal operation. By way of one example only of FIG. 2, such means may be a switch 220 mounted in a path of power between power input connection 214 and at least one circuit 210 and/or at least one discrete component 210a, 210b. When RF energy collection and processing means 18 detects that RF electromagnetic energy emission from the at least one circuit and/or at least one discrete component 210a, 210b deviates, due to anomaly, from a predetermined standard therefor, the processor 24 will trigger the switch 220 to OFF state, thus disabling supply of power to the at least one circuit 210 and/or at least one discrete component 210a, 210b. If more than one other circuit is provided within IC 200, the switch 220 may be mounted so as to disable supply of power to all such other circuits. Or a plurality of switches 220 may be provided, wherein each switch 220 is associated with a specific circuit. When a plurality of switches 220 is provided, the processor 24 may be configured to disable power to one, some or all circuits depending on the detected anomaly of the IC 200. Advantageously, a separate power input 114 is contemplated thus enabling intended operation of the RF energy collection and processing means 18. Or, an output 116, for example being of a digital type, may be set by the processor 24 to communicate a warning to higher level assembly having capability to disable or destroy operability of the at least one circuit 210 and/or at least one discrete component 210a, 210b.

Figure 3:
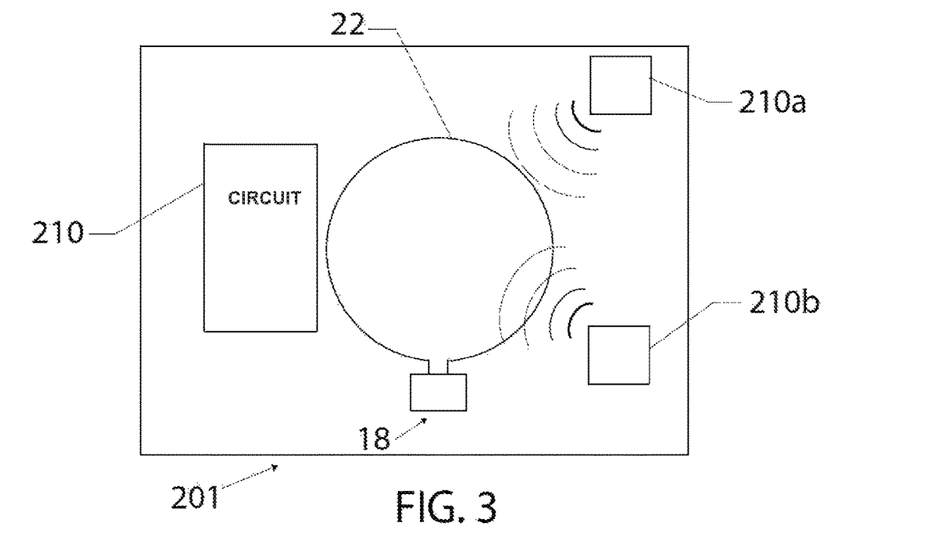
FIG. 3 is another schematic block diagram of an integrated circuit with electromagnetic energy anomaly detection and processing constructed in accordance with another embodiment of the invention and further incorporating the integrated circuit of FIG. 1.

Now in reference to FIG. 3, IC 201 operates generally identical to the IC 200 of FIG. 2, except that the antenna 22 is positioned between components 210a-210b so as to monitor more than one of such components in addition to monitoring status of the die 202.

Figure 4A:
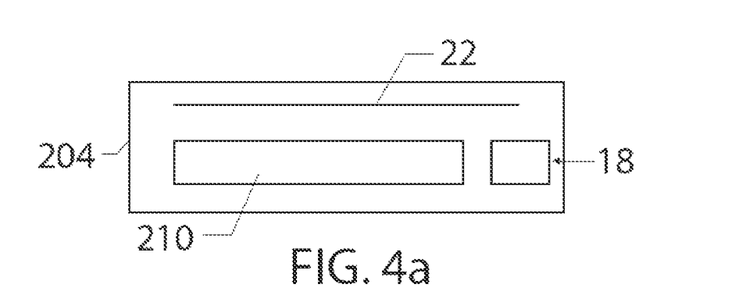
FIGS. 4a-4c illustrate spatial relationship of the components of the integrated circuit of FIG. 2.
Figure 4B:
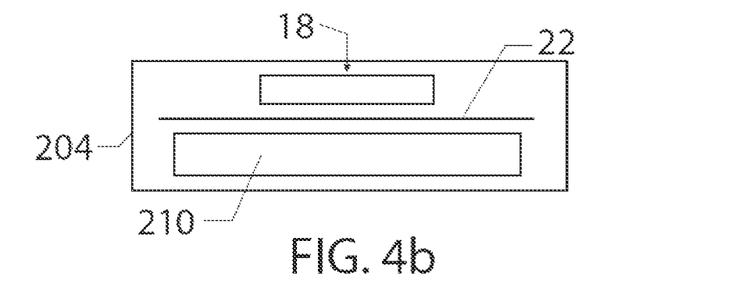
Figure 4C:
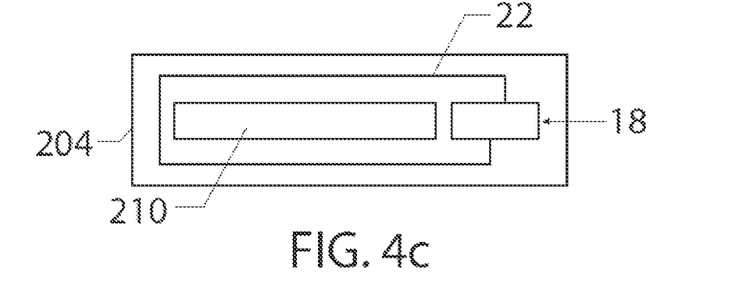

Now in reference to FIGS. 4a-4c, the instant invention contemplates further various special orientations of the RF energy collection and processing means 18, antenna 22 and the at least one circuit 210 and/or at least one discrete component 210a, 210b and further provides for a die 202 of either a single layer or a multi layer construction, as is conventional in the art.

The embodiments of FIGS. 2-4c are provided to detect any anomaly of the ICs 200, 201. In one example, the RF energy collection and processing means 18 may be configured to detect tampering of the at least one circuit 210 and/or at least one discrete component 210a, 210b with a focused ion beam technology. In another example, the RF energy collection and processing means 18 may be configured to at least detect tampering with the die 202 of the circuit 210 that is integrated and encapsulated into same physical component packaging 204. Further, RF energy collection and processing means 18 may be configured to detect at least one of modification and tampering of software operating within the IC 200. Yet further, RF energy collection and processing means 18 may be configured to detect tampering of the at least one circuit and at least one discrete component 210a, 210b. The RF energy collection and processing means 18 may be also configured to only detect tampering of the die 202.

Figure 5:
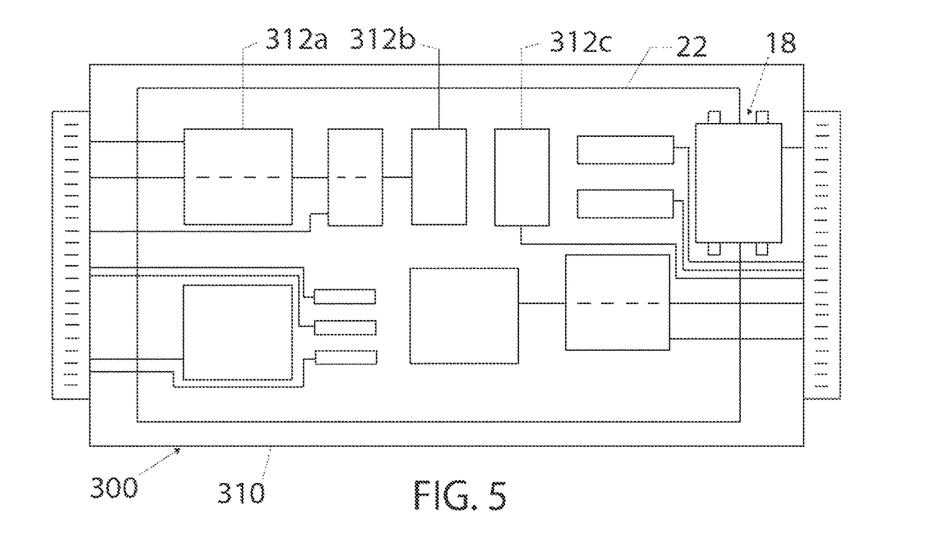
FIG. 5 is a schematic block diagram of a printed circuit board assembly employing the integrated circuit of FIG. 1 or 2.

The instant invention also contemplates that at least one of the IC 100, IC 200 and IC 201 is mounted onto a device 310, such as a printed circuit board (PCB) of a PCB assembly, generally designated as 300, as best shown in FIG. 5. In this embodiment, the RF energy collection and processing means 18 is responsive to RF energy emitted by at least one component 312a-312c on the PCB assembly 300. Several orientations of the RF energy collection and processing means are contemplated to include on-board or off-board configurations and orientations of the RF energy collection and processing means 18. Numerous orientations and configurations of the antenna 22 used in conjunction with the RF energy collection and processing means 18 are also further contemplated. For example, it is contemplated that the antenna 22 could be integrated and encapsulated in the same device package as the RF energy collection and processing means 18. In another configuration, the RF energy processing and collection means 18 including the antenna 22 are configured as a system on a chip. It is further contemplated that the antenna 22 could be etched onto the PCB assembly 300. In another contemplated configuration, the antenna 22 is external to the PCB 310 and is mounted in a traditional fashion extending from the PCB 310. In yet another contemplated configuration, the antenna 22 is a conformal antenna that mounts to any conformal feature of the product the PCB 310 is being integrated into.

The embodiment of FIG. 5 is provided to detect any anomaly of the PCB assembly 300.

In one example, the RF energy collection and processing means 18 is configured to detect at least one of tampering and counterfeiting of the at least one component 312a-312c on the PCB assembly 300. In another example, RF energy collection and processing means 18 is configured to detect degradation of the at least one component 312a-312c. In yet another example, RF energy collection and processing means 18 may be configured to continuously monitor RF energy emissions of the die 202 of the IC 200 and any changes to the RF energy emissions due to any factors that change the emissions characteristics collected by the RF energy collection means 18. Or, the RF energy collection and processing means 18 may be configured to self-predict Remaining Useful Lifetime (RUL) of at least one of die 110 and the other die 202. RF energy collection and processing means 18 may be also configured to detect any components being either tampered with on the PCB 310 or introduced in tampered or counterfeited state to the PCB 310.

Figure 6:
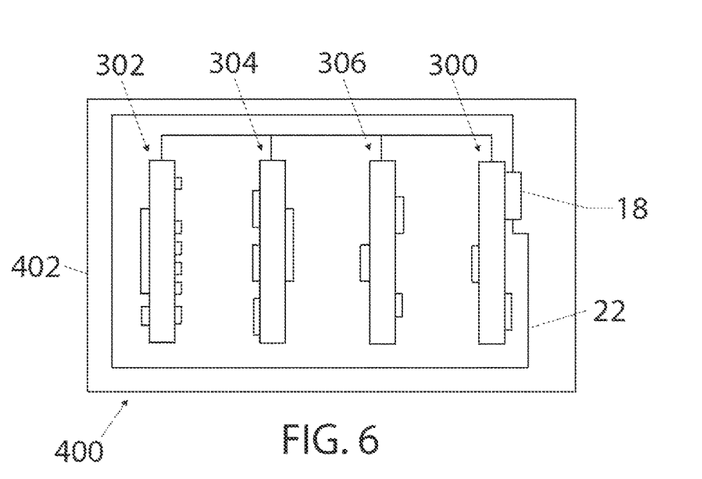
FIG. 6 is a schematic block diagram of a device incorporating the printed circuit board assembly of FIG. 5.

Now in reference to FIG. 6, the PCB assembly 300 is mounted within a device 400 including an optional casing 402 and at least one or a plurality of additional PCB assemblies 302, 304 and 306. It would be understood that device 400 also defines a fully assembled device, for example being ready for sale in retail or wholesale operations.

In this embodiment, the RF energy collection and processing means 18 is configured to detect at least one of tampering and counterfeiting of the at least one circuit board 300, 302, 304 and 306 or at least one component mounted thereon. The RF energy collection and processing means 18 may be also configured to provide health monitoring of the at least one component 312a-312c on the PCB 310 that the IC 100, 200 or 201 is mounted to.

The embodiment of FIG. 6 is provided to detect any anomaly of the device 400. Advantageously, the RF energy collection and processing means 18 is configured and operable in this embodiment to provide at least one of tamper detection, anti-tamper monitoring, degradation monitoring, health monitoring, counterfeit detection, software changes monitoring, firmware changes monitoring and failure of the device 400. RF energy collection and processing means 18 may be configured to detect changes in the electromagnetic signature emission due to changes in the software operating the device 400 as a whole or due to any changes in software installed within the sub-assembly or component within the device 400. RF energy collection and processing means 18 may be configured to detect firmware changes in any integrated circuit or other component within the device 400. RF energy collection and processing means 18 may be also configured to destroy or disable operation of the device 400 in an event of at least one of hardware, firmware or software tampering, either by driving a predetermined component or generating a predetermined message to the controller (not shown) of the device 400. It would be understood that more than IC 100, 200 and 201 may be provided within the device 400 and configured either for independent or at least overlapping operation.

Figure 7:
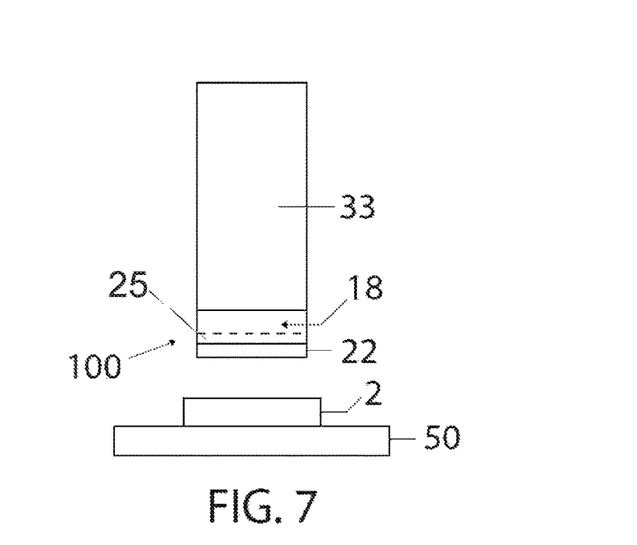
FIG. 7 is a schematic block diagram of the integrated circuit of FIG. 1 in combination with a robotic arm or wand.

Furthermore, the IC 100, with or without antenna 22, may be mounted on the tip 33 of the robotic arm 32 as shown in FIG. 7, which is a partial view of FIG. 2 of the co-pending U.S. Ser. No. 13/410,797 entitled "SYSTEM AND METHOD FOR PHYSICALLY DETECTING COUNTERFEIT ELECTRONICS", published as U.S. Pub. No. 2012-0226463 A1 on Sep. 6, 2012.

The instant invention contemplates that in the embodiments of FIGS. 2-7, the RF energy collection and processing means 18 may be also provided without the memory 26 by way of utilizing memory of the devices 200, 300 or 400.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

The invention claimed is:

1. A device comprising:
    at least one electronic component;
    an antenna; and
    an integrated circuit comprising:
    a die manufactured from a semiconducting material,
    a radio frequency (RF) energy collection and processing apparatus integrated into said die and coupled to said antenna, said RF energy collection and processing apparatus comprising:
    an emission detection apparatus receiving a spectral emission(s) of RF energy emitted, external to said integrated circuit, from said at least one electronic component when said device is supplied with a power signal and/or an oscillating signal, and
    means for comparing and matching the received RF energy emission(s) to a set of parameters identified for a baseline configuration of a genuine electronic component, said means comprising:
    at least one processor coupled to said emission detection apparatus, and
    algorithms operatively associated with said at least one processor and causing said at least one processor to process a signature(s) of said received RF energy emission(s) and determine a state(s) of said at least one electronic component attributable to said signature(s) of said received RF energy emission(s).

2. The device of claim 1, wherein said oscillating signal is one of a monotonic oscillating signal, a multi-tone signal, a modulating oscillating signal and a modulated oscillating signal.

3. The device of claim 1, further comprising an oscillator source sweeping across a selected frequency band, said sweeping occurring in a continuous or discretized manner.

4. The device of claim 1, wherein said RF energy is emitted from integrated circuit dies, wire bonds, semiconductor traces, board traces, wires, cables, a structural capacitive coupling or a structural inductive coupling.

5. The device of claim 1, wherein said emission detection apparatus includes a receiver being at least one of a heterodyne receiver, superheterodyne receiver, a wideband crystal video receiver, a tuned Radio frequency crystal video receiver, a narrowband scanning superheterodyne receiver, a channelized receiver, a microscan receiver, an acousto-optic receiver, a cryogenically cooled receiver and a tuner.

6. The device of claim 1, wherein said RF energy collection and processing apparatus has a noise figure of at least one of less than 5, less than 1, less than 0.5 and less than 0.1.

7. The device of claim 1, wherein said emission detection apparatus applies Fast Fourier Transform (FFT) in excess of one million points to said spectral emission(s), thereby improving its sensitivity.

8. The device of claim 1, wherein said oscillating signal is supplied by at least one of a temperature compensated Crystal Oscillator (TCXO), microcomputer compensated Crystal Oscillators (MXCO), Oven Controlled Crystal Oscillator (OCXO), small atomic frequency standards (Rubidium (Rb) and Rubidium oscillators (RbXO)), and high performance atomic standards.

9. The device of claim 1, wherein said at least one processor further performs a Discrete Wavelet Transform (DWT) on said emission(s).

10. The device of claim 1, wherein said at least one processor executes a large scale comparison between said spectral emission(s), then reduces said large scale comparison between said spectral emission(s) to narrowband comparisons and then reduces said narrowband comparisons to a single scalar value to establish said baseline configuration.

11. The device of claim 1, wherein said antenna is of at least one type selected from stacked loop, fractal, irregular loop, array of dipoles, parabolic antenna shape structure, Vivaldi antenna, equiangular spiral, skewed spiral, micromachined horn and waveguide structure.

12. The device of claim 1, wherein said at least one processor further calculates discrete wavelet transform coefficients to comparing and matching of said signature(s) of said received RF energy emission(s) to RF emission signature characteristics for the genuine electronic component.

13. The device of claim 1, wherein said at least one processor analyzes, during processing of said received RF energy emission(s), at least one of frequency locations of components of said received RF energy emission(s), phases of said received RF energy emission(s), cross-modulation and inter-modulation components of said received RF energy emission(s), a shape of said received RF energy emission(s), and quality factors of said received RF energy emission(s) or timing characteristics of said received RF energy emission(s); and discerns the state of each of said at least one electronic component as being a genuine electronic component or a counterfeit electronic component, based on the analysis.

14. The device of claim 1, wherein said baseline configuration comprises at least one of local spectral power density statistics, Emission Frequency Location, Emission Peak Magnitude, Emission Phase Noise, Emission Symmetry, Emission Skewness, and Emission Local Noise Floor.

15. An apparatus for detecting a state(s) of an electrical device, said apparatus comprising:
an antenna;
an integrated circuit comprising:
a die manufactured from a semiconducting material,
a radio frequency (RF) energy collection and processing apparatus integrated into said die and coupled to said antenna, said RF energy collection and processing apparatus comprising:
a receiver receiving an emission(s) of RF energy emitted, external to said integrated circuit, from the electrical device when the electrical device is energized with a signal, and
means for comparing and matching a received RF energy emission(s) to a set of parameters identified for a baseline configuration of a genuine electrical device, said means comprising:
at least one processor coupled to said receiver, and
algorithms operatively associated with said at least one processor and causing said at least one processor to process a signature(s) of said received RF energy emission(s) and determine a state(s) of the electrical device attributable to said signature(s) of said received RF energy emission(s).

16. The apparatus of claim 15, further comprising a robotic arm having a tip that is positioned, during operation of said apparatus, at a distance above a surface of the electrical device.

17. The apparatus of claim 16, wherein said antenna is an antenna array mounted on said tip and wherein said antenna array comprises a low noise amplifier (LNA).

18. The apparatus of claim 17, wherein said tip with said antenna array and said LNA is of interchangeable type.

19. The apparatus of claim 16, wherein said robotic arm is operable to change an orientation of said antenna.

20. The apparatus of claim 16, further comprising a sensor coupled to said apparatus for setting said distance between about one micrometer and about one centimeter from the surface of the electrical device.

21. The apparatus of claim 15, wherein said antenna is mounted stationary and wherein the electrical device is mounted for a movement beneath said antenna.

22. The apparatus of claim 15, wherein said antenna is an antenna array with a pattern of antenna elements, wherein each antenna element is weighted to enhance a gain on at least one area of the electrical device in order to inspect at least one part within said at least one area and held by the electrical device.

23. The apparatus of claim 15, further comprising an illumination source illuminating the electrical device with RF energy being at least one of a single frequency monotonic RF energy, a multi-tone RE energy, and a complex modulated RF energy to amplify and/or alter characteristics of the RF energy radiated from the electrical device and received at said emission detection apparatus.

24. The apparatus of claim 23, wherein said illumination source introduces free field EM field signals having corresponding strengths at select frequencies of said emission(s).

25. The apparatus of claim 15, wherein said received RF energy emission(s) is converted from an analog form into a digital form.

26. The apparatus of claim 15, wherein said signal is at least two oscillatory signal inputs energizing the electrical device, said at least one processor compares emission(s) of RF energy emitted by the electrical device in a response to each of said at least two oscillatory signal inputs individually with emission(s) of RF energy emitted by the electrical device in a response to said at least two oscillatory signal inputs in a combination with each other.

27. The apparatus of claim 15, further comprising a fixture having the electrical device mounted thereon, wherein said signal is one of a power signal, an oscillating signal and a combination thereof and wherein said apparatus further comprises a connection between the electrical device and said fixture, said fixture providing said signal via said connection.

28. The apparatus of claim 27, wherein said connection comprises two surface level contacts and wherein the device is temporarily secured on said fixture during operation of said apparatus.

29. The apparatus of claim 15, wherein said integrated circuit is configured as a system on a chip.

30. The apparatus of claim 15, wherein said algorithms further cause said at least one processor to match processed signature(s) to an expected signature and determine the state(s) the electrical device as being a poor quality electrical device or a counterfeit electrical device.

31. The apparatus of claim 15, wherein said antenna is a conformal antenna.

32. The apparatus of claim 15, wherein the electrical device is a printed circuit board (PCB) assembly, the state(s) being indicative of a software and/or hardware anomaly within the PCB assembly.

33. The device of claim 32, wherein said at least one processor performs successive low-pass and high-pass filtering operations to decompose the received RF energy emission(s).

* * * * *